US011586651B2

(12) United States Patent
Rykowski et al.

(10) Patent No.: US 11,586,651 B2
(45) Date of Patent: Feb. 21, 2023

(54) MULTIPLE DOMAIN DIRECTORY INTEGRATION

(71) Applicant: AirWatch LLC, Atlanta, GA (US)

(72) Inventors: Adam Rykowski, Atlanta, GA (US); Kalyan Regula, Alpharetta, GA (US); Nishita Manjunath, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 1641 days.

(21) Appl. No.: 14/811,301

(22) Filed: Jul. 28, 2015

(65) Prior Publication Data
US 2017/0032042 A1    Feb. 2, 2017

(51) Int. Cl.
*G06F 16/00* (2019.01)
*G06F 7/00* (2006.01)
*G06F 16/28* (2019.01)
*G06F 16/25* (2019.01)

(52) U.S. Cl.
CPC .......... *G06F 16/282* (2019.01); *G06F 16/256* (2019.01)

(58) Field of Classification Search
CPC .......... G06F 17/3005; G06F 17/30112; G06F 17/30554; G06F 17/30696; G06F 17/30769; G06F 17/30837; G06F 17/30941; G06F 17/30991; G06F 16/156; G06F 16/248; G06F 16/338; G06F 16/438; G06F 16/638; G06F 16/738; G06F 16/838; G06F 16/9038; G06F 16/282; G06F 16/256
USPC ........................................................ 707/722
See application file for complete search history.

(56) References Cited

U.S. PATENT DOCUMENTS

| 7,280,971 | B1* | 10/2007 | Wimberly | G06Q 20/102 705/63 |
| 2003/0126137 | A1* | 7/2003 | McFadden | G06F 16/288 |
| 2006/0242685 | A1* | 10/2006 | Heard | H04W 12/35 726/3 |
| 2009/0241125 | A1* | 9/2009 | Sheehan | G06F 40/166 719/315 |
| 2011/0264621 | A1* | 10/2011 | Burjoski | H04L 61/1552 707/610 |

(Continued)

*Primary Examiner* — Raquel Perez-Arroyo
(74) *Attorney, Agent, or Firm* — Thomas | Horstemeyer, LPP

(57) ABSTRACT

Disclosed are various examples of integrating multiple domains within a directory service. A computing device retrieves a first list of members in a first group of users for the domain from a first directory service for a first domain. The computing device then determines that a second group of users is a member of the first group of users, wherein the second group of users corresponds to a second domain. The computing device then retrieves a second list of members in the second group of users from a second directory service for a second domain. The computing device subsequently compares the first list of members in the first group of users and the second list of members in the second group of users with a third list of members in a third group of users, wherein the third list of members in the third group of users corresponds to a user list maintained by the application. The computing device then adds to the third list of members in the third group of users each user that is both present in the first list of members in the first group of users or in the second list of members in the second group of users and missing from the third list of members in the third group of users.

20 Claims, 5 Drawing Sheets

(56) References Cited

U.S. PATENT DOCUMENTS

| | | | |
|---|---|---|---|
| 2012/0096365 A1* | 4/2012 | Wilkinson | G06F 9/468 |
| | | | 715/740 |
| 2013/0103816 A1* | 4/2013 | Morley | G06F 9/541 |
| | | | 709/223 |
| 2013/0219176 A1* | 8/2013 | Akella | H04L 63/0815 |
| | | | 713/165 |
| 2014/0006347 A1* | 1/2014 | Qureshi | G06F 21/53 |
| | | | 707/621 |
| 2015/0033297 A1* | 1/2015 | Sanso | H04L 63/126 |
| | | | 726/5 |

* cited by examiner

MULTIPLE DOMAIN DIRECTORY INTEGRATION

BACKGROUND

Electronic directory services store, organize, and provide access to information in a hierarchical manner by mapping names to values. Directory services may be narrow in scope, supporting only a small set of node types and data types, or may be broad enough to support an arbitrary or extensible set of types. For example, directory services such as Microsoft's Active Directory®, Novell's Netware Directory Services® (NDS), or NetIQ's eDirectory® can support managing nodes, such as users, computers, printers, or other shared resources, that represent resources that can be managed by an operating system. These directory services can store information about these resources (e.g. user names, computer names, group memberships of users or computers, and other information) and enforce policies for these resources (e.g. specifying user password strengths, limiting user access to particular files or computers, as well as other policies).

Directory services can be associated with a specific domain or domain name. For example, a directory service can store information for users and computers associated with the domain "example.com." Further, the directory service can track relationships between the domain and other domains. For example, the directory service can identify individual members of a group of users in a first domain (e.g. the individual members of the All-Sales group from the domain "example.com") even if those individual members are from a second domain. To illustrate the point, the directory service may be able to determine that members of the All-Sales group for "example.com" include the group US-Sales from the domain "us.example.com" and the group EU-Sales from the domain "eu.example.com". However, the directory service may not be able to recursively resolve or otherwise identify the members of groups from the second domain. In other words, the directory service may be able to identify that the members of All-Sales include the user groups US-Sales and EU-Sales, but may be unable to identify the individual members of the user groups US-Sales and EU-Sales. This problem compounds when attempting to correlate the directories corresponding to multiple organizations, such as when one organization acquires or spins off from another. The records for tens or potentially hundreds of thousands of users will need to be examined to ensure that resources are assigned to the correct groups and given the correct permissions.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for recursively querying directory services using, for example, lightweight directory access protocol (LDAP) queries. Directory services can provide catalogs that identify users, computers, and other network resources associated with a particular network, such as a network identified by a domain name. In some instances, a catalog for one network might include a group of users that identifies users or groups of users from another catalog for another network maintained by another directory service. In these instances, catalogs may need to be recursively queried to identify all members within a group.

Because this recursive query functionality can use queries that comply with one or more versions of LDAP, directory services from multiple vendors can be queried. For example, the recursive query functionality can function with Microsoft's Active Directory, Novell's Netware Directory Services (NDS), NetIQ's eDirectory, as well other directory services that implement LDAP. Therefore, group membership can be determined independent of the implementation of a directory service and group membership can be determined in heterogeneous environments, such as environments where a domain is managed by one directory service (e.g. Active Directory), but a subdomain is managed by another directory service (e.g. eDirectory). These heterogeneous environments often arise, for example, as a result of mergers between organizations.

As a result of using recursive queries, a single enterprise management application or suite of enterprise management applications can manage users and groups of users spread out across multiple domains or managed by multiple, different directory services. For example, if one department of an organization were managing users and resources with eDirectory and another department were relying upon Active Directory, a single enterprise management application or suite of applications could use the approaches described below to manage users and resource in both departments. For example, the enterprise management application could push out policies to users managed by both directory services, import user account information from both directory services, and detect changes to user accounts managed by either directory service.

Figure 1:
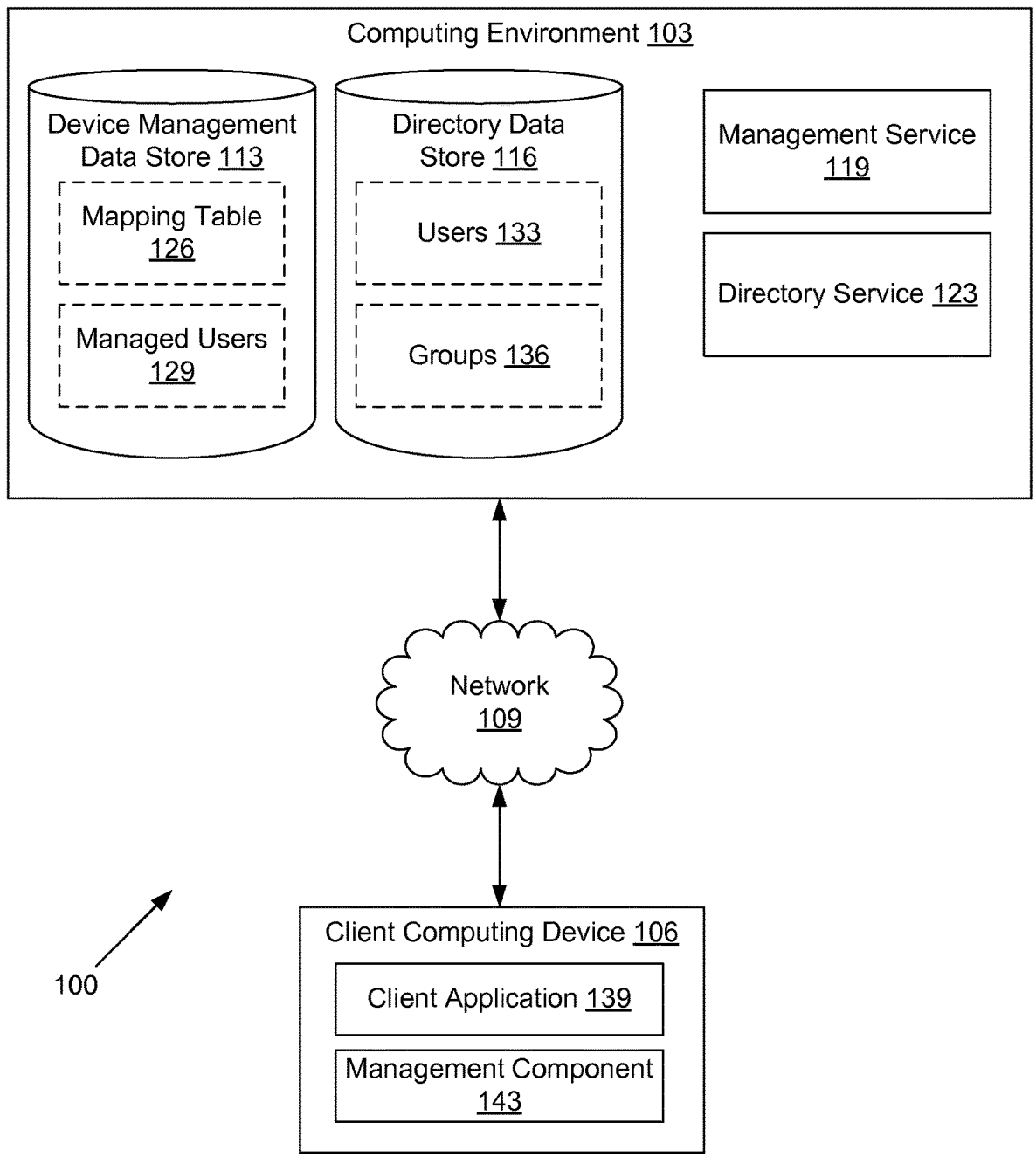
FIG. 1 is a schematic block diagram depicting a networked environment according to various examples of the present disclosure.

With reference to FIG. 1, shown is a networked environment 100 according to various embodiments. The networked environment 100 includes a computing environment 103 and a client computing device 106, which are in data communication with each other via a network 109. The network 109 includes, for example, the Internet, intranets, extranets, wide area networks (WANs), local area networks (LANs), wired networks, wireless networks, other suitable networks, or any combination of two or more such networks. For example, these networks can include satellite networks, cable networks, Ethernet networks, and other types of networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource, or any other distributed computing arrangement. In some cases, the computing environment 103 can correspond to an elastic or virtualized computing resource where the allotted capacity of processing, network, storage, or other computing-related resources can vary over time.

Various applications or other functionality can be executed in the computing environment 103 according to various embodiments. Also, various data is stored in one or more data stores that are accessible to the computing environment 103. These data stores can include a device management data store 113 and directory data store 116. The data stored in the device management data store 113 and the directory data store 116, for example, is associated with the operation of the various applications and functional entities described below. The components executed on the computing environment 103 can include, for example, a management service 119, a directory service 123, and other applications, services, processes, systems, engines, or functionality not discussed in detail herein.

The management service 119 can manage and oversee the operation of one or more client computing devices 106. In one example, an employer can operate the management service 119 to ensure that the client computing devices 106 of its employees operate in compliance with the security policies. In another example, an employer can configure the management service 119 to enforce different policies (or no policies at all) based upon which users or employees are currently logged into or otherwise operating the client computing device 106. The management service 119 can also facilitate access to email, calendar data, contact information, and other resources provided by the computing environment 103 or accessible on the client computing device 106.

The directory service 123 can store, organize, and provide access to information in a hierarchical manner by mapping names to values. In some instances, the directory service 123 organizes information by domain (e.g. "example.com," "company.com," or "us.company.com"). For example, the directory service 123 may store information regarding user accounts and computing devices associated with a domain corresponding to the directory service 123, such as all user accounts and computers registered to access resources within the "example.com" domain. In some instances, the directory service 123 can provide additional functionality, such as authenticating logins for user accounts within a domain, applying policies to user accounts within a domain (e.g. password requirements, limiting access to files and applications) or to computing devices linked to a domain (e.g. mandating that certain applications be installed on a computing device or that certain software be installed to a computing device when a particular user is logged in).

As previously indicated, various data necessary for the operation of the management service 119 and the directory service 123 can be stored in the device management data store 113 or the directory data store 116. The data stored in the device management data store 113 can include, for example, a mapping table 126, a list of managed users 129, and potentially other data. The data stored in the directory data store 116 can include, for example, users 133 and groups 136.

The mapping table 126 can represent a list of canonical domain names and the domain name system (DNS) address or intern& protocol (IP) address of the corresponding controller of the directory service 123 for the canonical domain name. As an example, if the mapping table 126 included an entry for the canonical domain of "company.com," it could have a corresponding link to the DNS address (e.g. "dc.company.com") or IP address (e.g. "123.123.123.123") of the controller of the directory service 123 for the "company.com" domain. The list of managed users 129 can represent those users, user accounts, or client computing device 106 that are managed by the management service 119. The list of managed users 129 can include or correspond to various users 133 stored in the directory data store 116.

Users 133 can correspond to user accounts authorized to access the domain managed by the directory service 123. A user name, password, and potentially other data can be stored in association with users 133.

Groups 136 can represent logical groupings of users 133 to facilitate management of users 133. For example, users 133 who are in the sales department may be included in a "Sales" group 136. Policies applied to the "Sales" group 136 could then automatically be applied to each of the users 133 who is a member of the "Sales" group 136. In some instances groups 136 can be members of other groups 136. For example, an "All Sales" group 136 may include among its members an "East Coast Sales" group 136 that include all sales employees east of the Mississippi river and a "West Coast Sales" group 136 that include all sales employees west of the Mississippi river. Policies and settings applied to the "All Sales" group 136 could then be applied to the members of the "East Coast Sales" group 136 and the "West Coast Sales" group 136, which in turn would be applied to each user 133 in each of the groups 136.

Each group 136 managed by a directory service 123 can also include individual users 133 or groups 136 managed by other directory services 123. For example, a group 136 managed by the directory service 123 for the domain "company.com" can include individual users 133 or groups 136 managed by the directory service 123 for the subdomains "us.company.com" and "eu.company.com." If a sufficient trust relationship exists between two directory services 123 for two different domains, a group 136 of users 133 for a first domain can include users 133 or groups 136 managed by a directory service 123 for a second domain. For example, if a directory service 123 for "company.com" is configured to trust a directory service 123 for "example.com," then groups 136 for the "company.com" domain can include users 133 and groups 136 of users 133 from the "example.com" domain.

The client computing device 106 can be representative of a plurality of client devices that can be coupled to the network 109. The client computing device 106 can include, for example, a processor-based system such as a computer system. A computer system can be of a desktop computer, a laptop computer, personal digital assistants, cellular telephones, smartphones, set-top boxes, music players, web pads, tablet computer systems, game consoles, electronic book readers, or other devices with like capability. The client computing device 106 can include a display. The display can include, for example, one or more devices such as liquid crystal display (LCD) displays, gas plasma-based flat panel displays, organic light emitting diode (OLED) displays, electrophoretic ink (E ink) displays, LCD projectors, or other types of display devices.

The client computing device 106 can execute various applications such as a client application 139, management component 143, or other applications. The client application 139 can be executed in a client computing device 106, for example, to access network content served up by the computing environment 103 or other servers, thereby rendering a user interface on the display. To this end, the client application 139 can include, for example, a browser or a dedicated application, and the user interface can include a network page, an application screen, or other user interface. The client computing device 106 can execute applications beyond the client application 139 such as email applications, social networking applications, word processors, spreadsheets, or other applications.

The client computing device 106 can also execute a management component 143. The management component 143 can control or limit access to various resources of the client computing device 106 by a current user of the client computing device 106 or the client application 139. The management component 143 can also limit access of the client computing device 106 to network content. The management component 143 can limit access based at least in part on one or more policies or other instructions supplied by the management service 119 to the management component 143.

Next, a general description of the operation of the various components of the networked environment 100 is provided. To begin, the management service 119 connects to a directory service 123 for a domain. The management service 119 then queries the directory service 123 to identify a list of members of a group 136 of users. The group 136 can represent the list of users in the domain that are to be managed by the management service 119.

The management service 119 then identifies the users 133 in the group 136. If multiple groups 136 are included in the members of the group 136, the management service 119 can query the directory service 123 to determine which users 133 are members of those groups 136. For example, if the group 136 "All Sales" included the groups 136 "US Sales" and "Asia Sales" as members, the management service 119 can query the directory service 123 to determine which users 133 are members of the "US Sales" group 136 and the "Asia Sales" group 136. In the event that either of the "US Sales" group 136 or the "Asia Sales" group 136 has additional groups 136 as members (e.g. "Florida Sales"), the management service 119 can recursively query the directory service 123 until a complete list of users 133 is identified.

The management service 119 can then compare the identified users to the list of managed users 129. Based at least in part on the comparison, the management service 119 can add to the list of managed users 129 any users that were identified from querying the directory service 123 that were not present in the list of managed users 129. Similarly, the management service 119 can remove users 133 from the list of managed users 129 that are not identified in the results returned from the queries of the directory service 123.

After updating the list of managed users 129, the management service 119 can then determine whether any newly added users 133 in the list of managed users 129 are associated with a client computing device 106. For example, the management service 119 can determine that the management component 143 has previously reported a user 133 as being logged into a client computing device 106. Similarly, the management service 119 can determine that a management component 143 has previously reported a client computing device 106 as being registered to the user 133. The management service 119 can then send one or more policies to the management component 143 to be enforced locally on the client computing device 106.

Similarly, the management service 119 can determine whether any client computing devices 106 are currently being managed by the management service 119 but are no longer associated with one of the managed users 129. For example, a management component 143 can report that the client computing device 106 it is installed on is associated with a user 133. The management service 119 can then compare the user 133 to the list of managed users 129 and determine that the user 133 associated with the client computing device 106 is not included in the list of managed users 129. As a result, the management service 119 can withdraw any policies previously sent to the management component 143.

Figure 2:
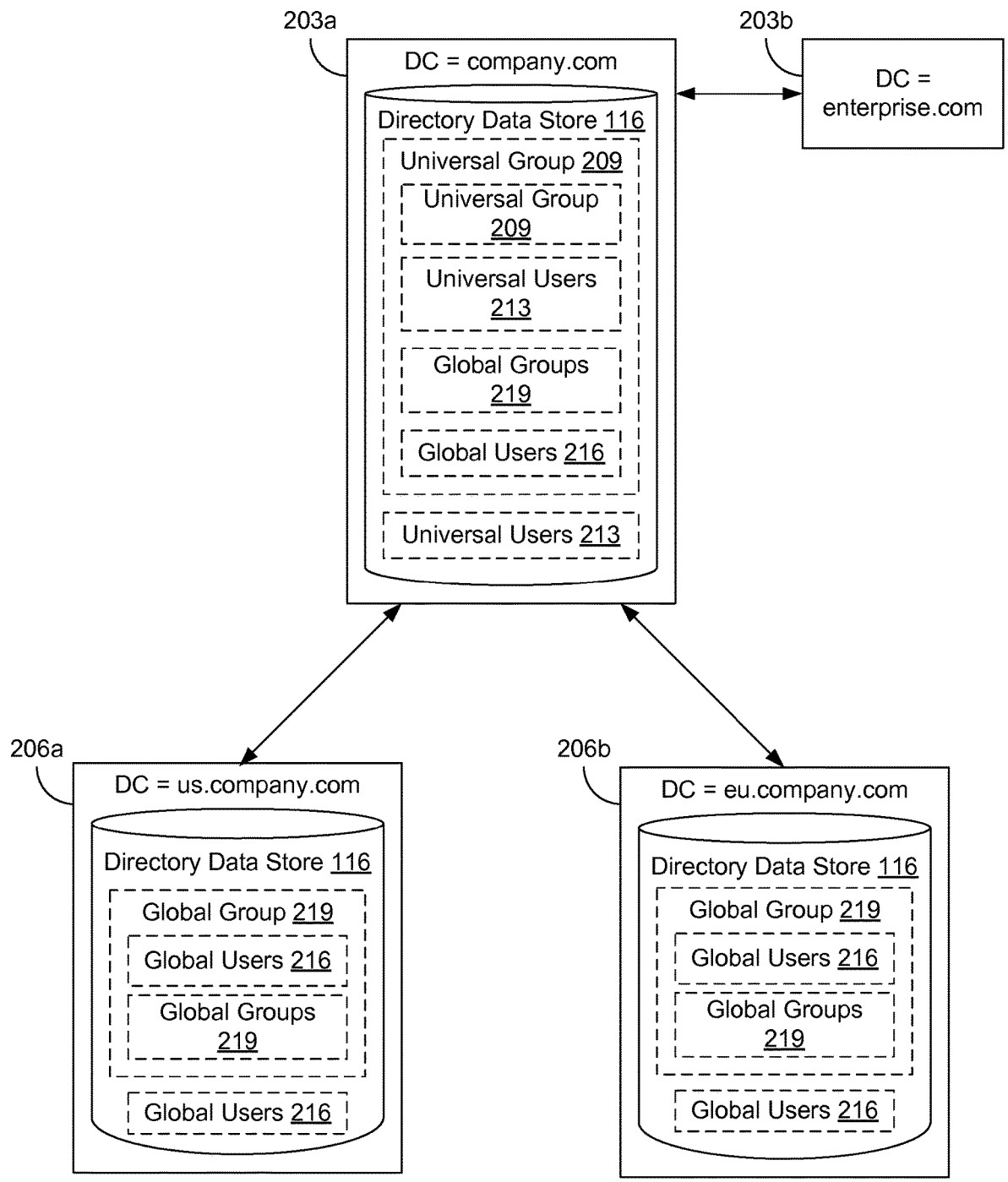
FIG. 2 is a diagram depicting one example of a directory service according to various examples of the present disclosure.

Referring next to FIG. 2, shown is an example of a domain hierarchy 200 provided by one or more directory services 123. At the highest level are one or more universal domain controllers 203, such domain controller 203a and domain controller 203b. The universal domain controllers 203 can be configured to store data relating to a domain (e.g. "company.com," "enterprise.com" or any other domain). A universal domain controller 203 can include a directory data store 116. Universal groups 209 and universal users 213 can be stored within the directory data store 116 of the universal domain controller 203. Universal users 213 correspond to user accounts and users that are valid within the domain and any subdomains (e.g. valid within "company.com," "us.company.com," "eu.company.com" and other subdomains of "company.com"). For example, a user account for a universal user 213 may have access or login privileges for computers within the domain "company.com" as well as the sub-domains "us.company.com" and "eu.company.com."

Universal groups 209 correspond to logical groupings of users or groups of users to assist in site-wide administration of users. Therefore, universal groups 209 can include one or more universal users 213, one or more other universal groups 209, one or more global users 216, or one or more global groups 219 of global users 216. For example, certain security policies such as a minimum password length can be applicable to all users, while other policies, such as access to specific files, can be applicable to all users within a particular group. Therefore, a universal group 209 called "All Employees" may include a global group 219 that includes all global users 216 in the us.company.com sub-domain (e.g. "All-US-Employees") and a second global group 219 that includes all global users 216 in the eu.company.com sub-domain (e.g. "All-EU-Employees").

One or more global domain controllers 206, such as global domain controllers 206a and 206b, can be below a universal domain controller 203. The global domain controller 206 can include a directory data store 116 which stores all information related to the domain assigned to the global domain controller 206. This can include information related to one or more global users 216 as well as one or more global groups 219 that include one or more global users 216 or one or more other global groups 219 within the domain assigned to the global domain controller 206. For example, a global domain controller 206 assigned to the domain "us.company.com" would include a list of global users 216 who are members of the domain "us.company.com." As another example, a global group 219 for "All-US-Sales" may include as members the global group 219 for "US-Sales-East" and the global group 219 for "US-Sales-West." Individual global users 216 who were members of either the "US-Sales-East" global group 219 or the "US-Sales-West" global group 219 would therefore also be members of the global group 219 "All-US-Sales."

Figure 3:
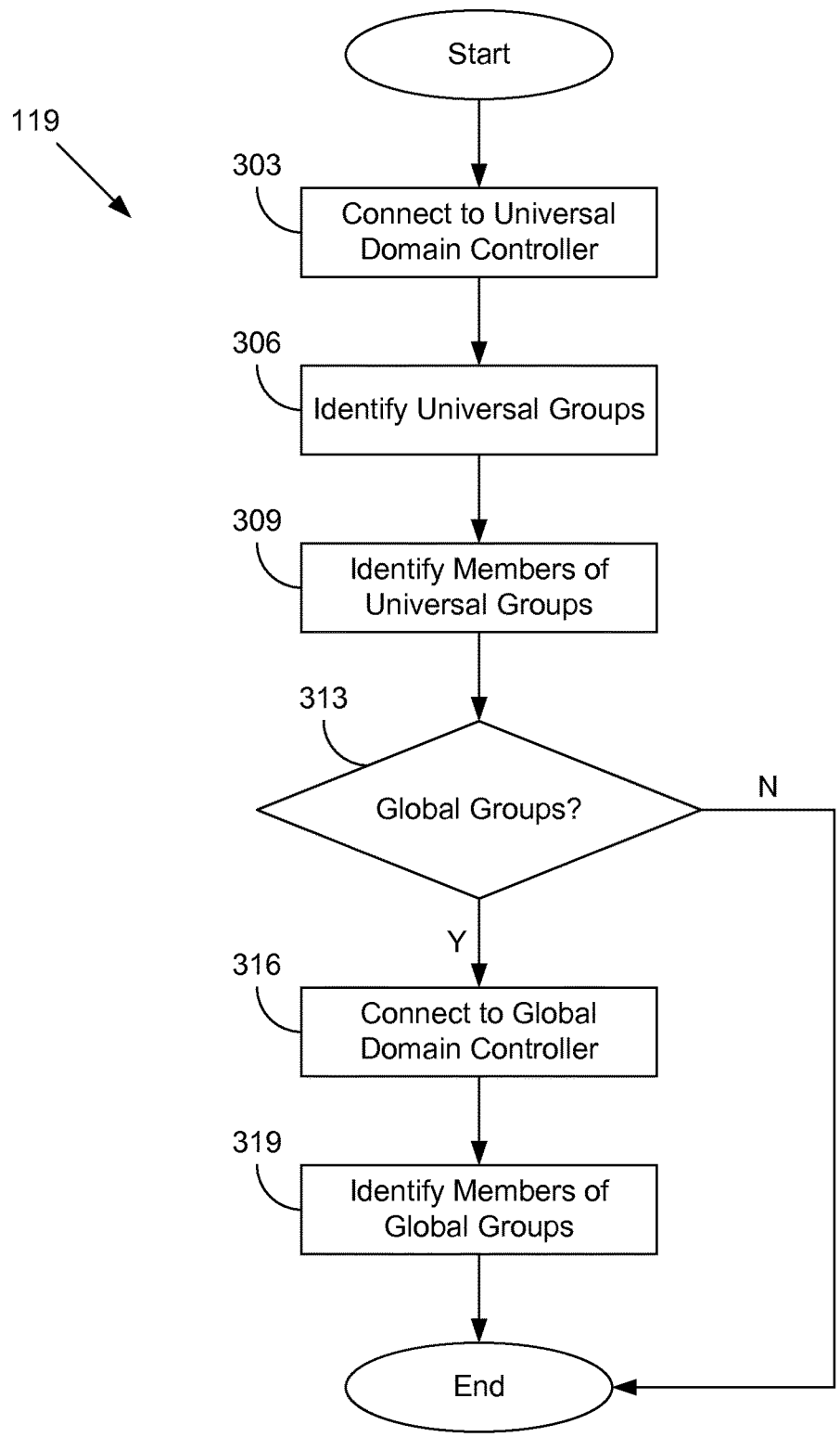
FIG. 3 is a flowchart illustrating one example of functionality according to various examples of the disclosure.

Referring next to FIG. 3, shown is a flowchart that provides one example of the operation of a portion of the management service 119. As an alternative, the flowchart of FIG. 3 can be viewed as depicting an example of elements of a method implemented in the computing environment 103.

Beginning with step 303, the management service 119 can create a network connection to a universal domain controller 203 of a directory service 123. In some implementations of the universal domain controller 203 or directory service 123, this operation can be referred to as "binding" to the universal domain controller 203.

Proceeding next to step 306, the management service 119 identifies one or more universal groups 209. The management service 119 can send one or more LDAP queries to the universal domain controller 203 requesting the name of each of the universal groups 209 stored by the universal domain controller 203.

Moving on to step 309, the management service 119 can identify the members of the universal groups 209 identified. For the universal groups 209 identified in response to the previously submitted LDAP query, the management service 119 can issue a new LDAP query to the universal domain controller 203. The new LDAP query can identify a particular universal group 209 and specify that the members of the universal group 209 have been requested.

Referring next to step 313, the management service 119 can parse the response received from the universal domain controller 203 to determine the classification of the members of the universal group 209 specified in the previous LDAP request. For example, if a universal group 209 has three members, the management service 119 can determine whether each of the three members is a universal user 213, another universal group 209, a global user 216, or a global group 219. This determination could be based, for example, on the name of the member of the universal group 209 or be indicated as part of the response to the previous LDAP query. If any member of the universal group 209 is a global group 219, then execution of the process proceeds to step 316. However, if none of the members of the universal group 209 are a global group 219, then execution of the process subsequently ends.

Proceeding next to step 316, the management service 119 can create a network connection to a global domain controller 206 of the directory service 123. In some implementations of the global domain controller 206 or directory service 123, this operation can be referred to as "binding" to the global domain controller 206. The management service 119 can determine which global domain controller 206 to connect to by, for example, identifying the domain associated with the global group 219 and then using the domain to look up the global domain controller 206 in a mapping table 126.

Moving on to step 319, the management service 119 can identify the members of the global group 219. The management service 119 can, for example, send an LDAP query to the global domain controller 206 specifying the global group 219 and request a list of members in response. In the event that one or more members of the global group 219 are also global groups 219, the management service 119 can recursively send LDAP queries to the global domain controller 206 for each member global group 219 until a complete list of global users 219 is compiled. Execution of the process subsequently ends.

Figure 4:
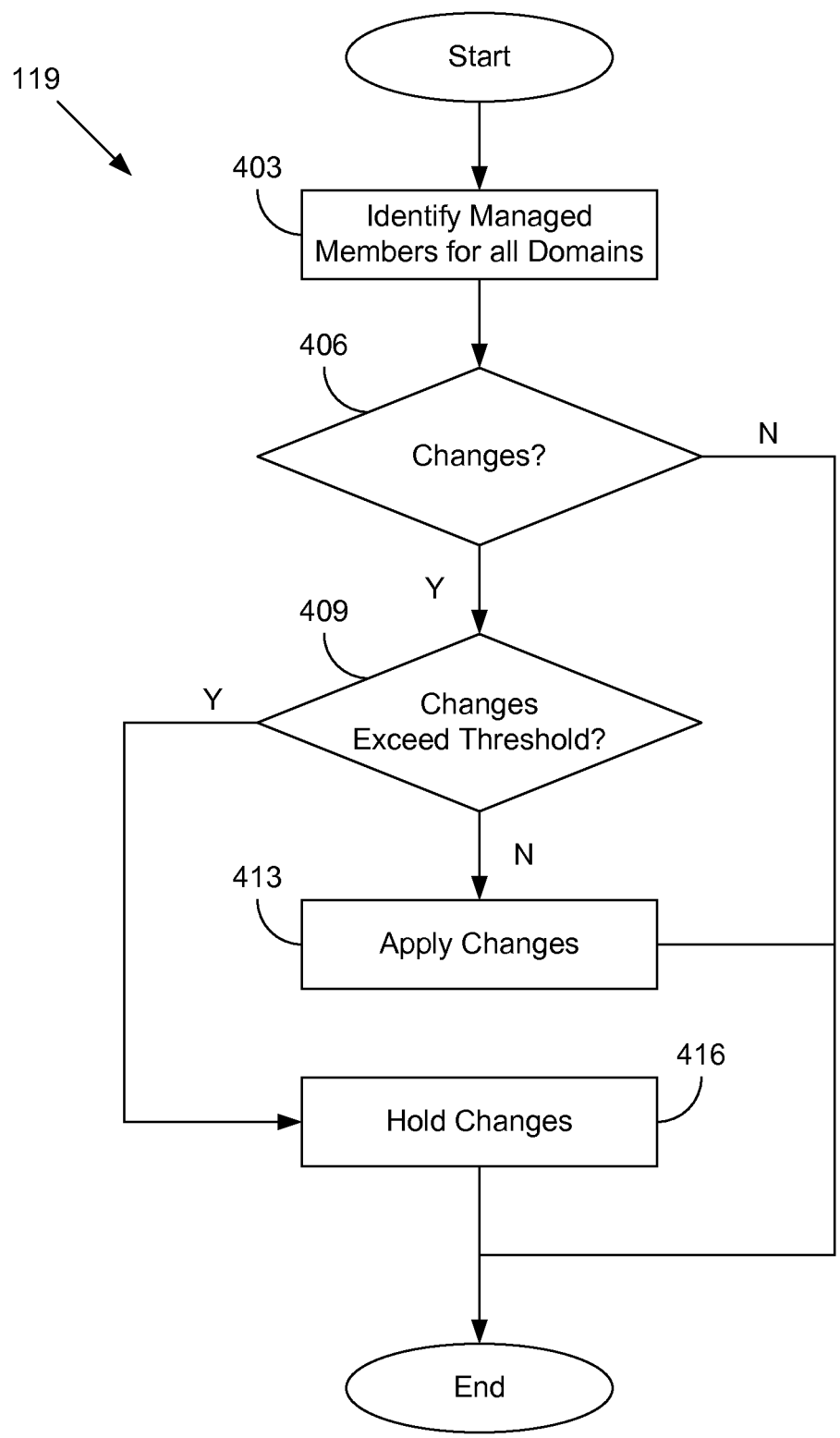
FIG. 4 is a flowchart illustrating one example of functionality according to various examples of the disclosure.

Referring next to FIG. 4, shown is a flowchart that provides one example of the operation of a portion of the management service 119. As an alternative, the flowchart of FIG. 4 can be viewed as depicting an example of elements of a method implemented in the computing environment 103.

Beginning with step 403, the management service 119 can identify members of a group of users whose account or client computing device 106 are to be managed by the management service 119. The identity of the group can be specified during installation or configuration of the management service 119. In the event that the group is a universal group 209 stored by a universal domain controller 203 that includes one or more global groups 219 of users, the management service 119 can use the process outlined previously in FIG. 3 to recursively identify all users that are to be managed.

Proceeding to step 406, the management service 119 can compare the users identified previously in step 403 to a list of managed users 129 that have been previously identified. Differences between the users identified previously in step 403 and the list of managed users 129 reflect the addition or removal of users from set of users to be managed by the management service 119. For example, if a user is identified in step 403 is not present in the list of managed users 129, this would indicate that the user has been added to or included in the set of users to be managed by the management service 119. Similarly, if a user is present in the list of managed users 129 but was not identified previously in step 403, then this could indicate that the user is no longer to be managed by the management service 119. If the set of users identified previously in step 403 match the list of managed users 129, this would indicate that no changes are to be made to the list of managed users 129 and execution of the process would end. However, if the set of users identified in step 403 differs from the list of managed users 129, then this indicates that changes are to be made to the list of managed users 129 and execution proceeds to step 409.

Moving on to step 409, the management service 119 can determine whether the number of users to be added to or removed from the list of managed users 129 exceeds a previously specified threshold. The threshold can be specified during installation of the management service 119 or configured at a later point in time. The threshold value can represent an error checking threshold to prevent accidental deletion or addition of large numbers of users to the list of managed users 129. For example, if the error checking threshold were set to 100 users, and the number of users to be added and removed from the list of managed users 129 were 120, this might indicate that a group of users or large number of users may have been accidentally added to or deleted from the set of users to be managed. If the number of changes does not exceed the threshold, then execution of the process proceeds to step 413. However, if the number of changes does exceed the threshold, then execution of the process proceeds to step 416.

Referring next to step 413, the management service 119 can apply the changes to the list of managed users 129. The management service 119 can remove users from the list of managed users 129 who were not identified in step 403 and add users to the list of managed users 129 that were identified in step 403 and not previously included in the list of managed users 129.

The steps of adding or removing users from the list of managed users can trigger application of updated security policies for mobile devices associated with the users. For example, users may bring their own mobile devices to work as part of a "bring-your-own-device" (BYOD) to work program. To provide enterprise mobility management, the management service 119 can install agent software on the mobile device of a managed user, along with other enterprise applications such as a secure intern& browser, calendar, e-mail application, and file repository access application for accessing and editing corporate files. The agent application can enforce the security policies received from the management service 119. The mobile devices can use differing security policies depending on the groups to which a device or a user associated with a device is a member.

For example, sales employees can be given access to documents relating to sales but be prohibited from accessing certain documents relating to research and development. In contrast, a software developer may be given access to research and development documents and source code files, but restricted from accessing sales documents. Additional examples of security policies include enforcing passwords of differing lengths for different users, granting or denying access to the calendar schedules of employees or groups of employees, granting or denying access to certain websites, requiring device or disk encryption, disabling use of a native mobile device web browser and requiring use of a secure web browser, and many other enterprise mobility management policies.

The policies and restrictions can be applied using management service 119 to individual users or groups of users. Examples of a group of users who could receive the same security policies include sales employees, sales employees for a given region, and sales employees for a given product. Larger organizations can include numerous employees of a given group that should share mobile device security policies. The policies for higher level groups can be enforced for all sub-groups. For example, a global sales group policy could require at least a four digit device password, meaning all sales groups within the global sales group would also require at least a four-digit password. However, the sales groups within the global sales group could choose to provide a more restrictive password requirement, such as six digits, since that would also meet the global sales group requirement.

In some examples, a domain can be associated with a group of users. As a result, step 413 of applying changes by adding or removing users from the list of managed users can also be associated with the step of updating user security policies based on the group of users. When a new user from a particular domain has been detected, the security policies from the user groups of which the new user is a member can be provided to the user's mobile device for enforcement by the agent application.

Proceeding next to step 416, the management service 119 can hold, pause, or otherwise delay applying changes to the list of managed users 129. The management service 119 can also prompt an administrator to take corrective action or confirm the changes. For example, the management service 119 can send an email to an administrator to confirm that the changes are to be made to the list of managed users 129. Execution of the process subsequently ends.

Figure 5:
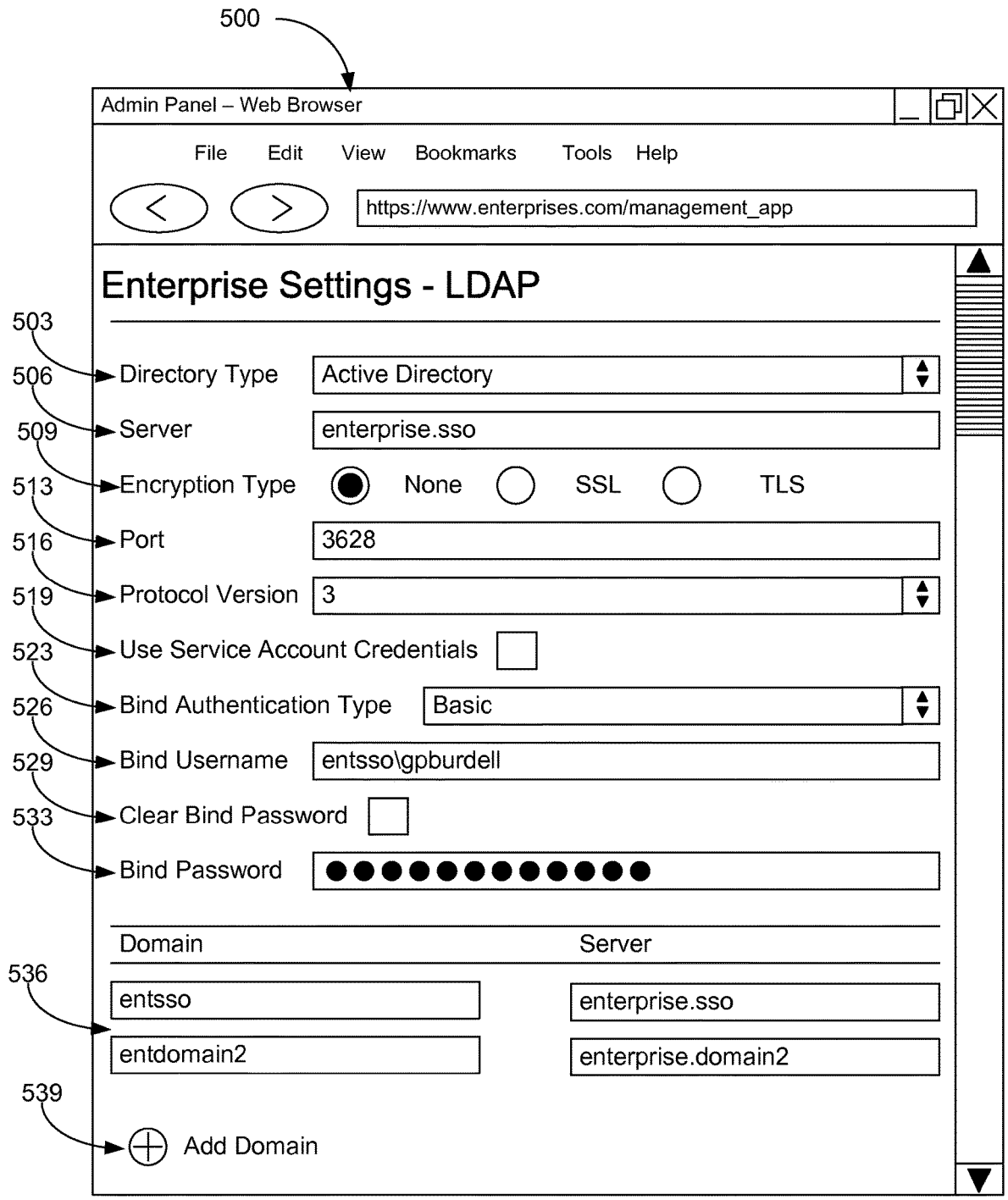
FIG. 5 is a pictorial representation of a user interface according to various examples of the disclosure.

Referring next to FIG. 5, shown is a pictorial representation of an example user interface 500 for interacting with the management service 119. The user interface 500 may include a web page or similar network content served by the management service 119, a mobile application that communicates with the management service 119 over a network, or a client application that interfaces with the management service 119 over a network. The user interface 500 can present one or more options for configuring the management service 119, as further described below.

For example, the user interface 500 can present a directory type option 503. The directory type option 503 can allow a user to specify the type of directory service 123 to which the management service 119 will bind. For example, the directory type option 503 can allow a user to specify that the directory service 123 is implemented using Microsoft's Active Directory® suite, NetIQ's eDirectory® suite, Red Hat's Directory Server® suite, or other directory service implementations. The directory type option 503 can be presented, for example, as a drop down menu of different types of directory services 123.

As another example, the user interface 500 can present a server option 506. The server option 506 can represent the network address for the server managing the directory service 123. For example, the server option 506 may allow a user to input a fully-qualified domain name identifying the server, an internet protocol address identifying the server, or another type of network address identifying the server responsible for the directory service 123.

In some instances, the user interface 500 can present an encryption option 509. The encryption option 509 can, for example, specify the encryption protocol to be used to secure a connection between the management server 119 and the directory service 123. For example, the encryption option 509 can allow a user to specify that no encryption is to be used, that the secure sockets layer (SSL) protocol is to be used, or that transport layer security (TLS) protocol is to be used.

As a further example, the user interface 500 can present a port option 513. The port option 513 can allow a user to specify the specific port on which the management server 119 should attempt to connect to the server for the directory service 123. In some instances, a default port value may be specified or recommended.

In another example, the user interface 500 can present a protocol version option 516. The protocol version option 516 can allow a user to specify a specific version of the LDAP protocol to be used for communication between the management server 119 and the server for the directory service 123.

In some instances, the user interface 500 can present a use service account credentials option 519. When this option is used, the management server 119 will use the credentials of the account under which the management server 119 is executing. For example, the management server 119 could be executing with administrative privileges under an administrator account, in which case the username and password for the administrator account would be used.

As a further example, the user interface 500 can present a bind authentication type option 523. For example, a user can specify that basic access authentication is to be used, which requires that the management server 119 submit a username and a password to the server for the directory service 123. As another example, a user can specify that digest access authentication can be used, which requires that the management server 119 send a username and a hashed version of a password to the server for the directory service 123. To generate the hashed version of the password, the password can be supplied as an input to the message digest 5 (md5) hash algorithm or similar hash algorithms.

In another example, the user interface 500 can present a bind username option 526. The bind username option 526 can allow a user to specify a specific username of the account to be used by the management service 119 to authenticate and communicate with the server for the directory service 123. In some instances, the bind username option 526 will also allow the user to specify the domain of the account to be used by the management service 119.

In some instances, the user interface 500 can present a clear bind password option 529. When this option is selected, the bind password described below can be deleted after it is used instead of being stored for future use.

As a further example, the user interface 500 can present a bind password option 533. The bind password option 533 allows a user to specify a password to be submitted by the management service 119 when authenticating or communicating with the server for the directory service 123.

In another example, the user interface 500 can present a list 536 of domains mapped to server addresses. This information can, for example, provide a visual representation of the information stored in the mapping table 126.

In some instances, the user interface 500 can also present a user interface element 539 that allows a user to add a new domain to the list 536 of domains mapped to server addresses. When the user manipulates the user interface element 539, a form may be presented to the user to specify the domain name and the corresponding network address for the server for the directory service 123 associated with the domain name. This information can then be stored in the mapping table 126.

The flowcharts of FIG. 3 and FIG. 4 show an example of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIG. 3 and FIG. 4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages might be added to the logical flow described herein, for purposes of enhanced utility, accounting, performance measurement, or troubleshooting aid. It is understood that all variations are within the scope of the present disclosure.

The computers within the computing environment 103, the client computing device 106, or other components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store, such as the device management data store 113 and the directory data store 116, can be stored in the one or more storage devices.

The management service 119, the directory service 123, and other components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A system, comprising:
   a computing device comprising a processor and a memory; and
   at least one service stored in the memory of the computing device that, when executed by the processor of the computing device, causes the computing device to at least:
   determine a universal group of users for a universal domain, wherein the universal group of users is associated with:
   a first list of members in a first group of users from a first global directory service,
   a second list of members in a global group of users from a second global directory service,
   a third list of members corresponding to a user list maintained by the at least one service, and
   a plurality of client devices managed by the at least one service;
   determine that the global group of users is a member of the first group of users, wherein the global group of users are members of a global domain stored in the second global directory service hosted by a global domain controller for the global domain;
   retrieve the second list of members in the global group of users from the second global directory service;
   compare the first list of members in the first group of users and the second list of members in the global group of users with the third list of members, wherein a third group of users comprises the third list of members;

add, to the third list of members in the third group of users, each user that is both:
  present in the first list of members or in the second list of members, and
  missing from the third list of members in the third group of users;
determine that a user in the third group of users is associated with a client device of the plurality of client devices; and
send a security policy applicable to the third group of users to a management component executing on the client device, the security policy specifying a limitation of functionality of the client device to be imposed by the management component.

2. The system of claim 1, wherein the at least one service, when executed by the processor of the computing device, further causes the computing device to at least remove from the third list of members in the third group of users any user that is present in the third list of members in the third group of users and omitted from both the first list of members and the second list of members.

3. The system of claim 1, wherein the at least one service, when executed by the processor of the computing device, further causes the computing device to at least:
associate, in a table, the universal domain and the second global directory service based at least in part on a domain name corresponding to the global domain.

4. The system of claim 1, wherein the at least one service, when executed by the processor of the computing device, further causes the computing device to at least:
count a number of users to be added to the third list of members in the third group of users;
determine that the number of users to be added exceeds a threshold value; and
delay an addition of users to the third list of members in the third group of users based at least in part on the number of users to be added exceeding the threshold value until confirmation is received from an administrator.

5. The system of claim 1, wherein the global domain is a trusted domain of the universal domain.

6. The system of claim 1, wherein the security policy is sent in response to an addition of a user to the third list of members in the third group of users.

7. The system of claim 1, wherein the at least one service comprises a management service and a universal directory service, the universal directory service hosted by a universal domain controller for the universal domain.

8. A method, comprising:
determining a universal group of users for a universal domain, wherein the universal group of users is associated with:
  a first list of members in a first group of users from a first global directory service,
  a second list of members in a global group of users from a second global directory service,
  a third list of members corresponding to a user list maintained by at least one service, and
  a plurality of client devices managed by the at least one service;
determining that the global group of users is a member of the first group of users, wherein the global group of users are members of a global domain stored in the second global directory service hosted by a global domain controller for the global domain;
retrieving the second list of members in the global group of users from the second global directory service;
comparing the first list of members in the first group of users and the second list of members in the global group of users with the third list of members, wherein a third group of users comprises the third list of members; and
adding, to the third list of members in the third group of users, each user that is both:
  present in the first list of members users or in the second list of members, and
  missing from the third list of members in the third group of users;
determining that a user in the third group of users is associated with a client device of the plurality of client devices; and
sending a security policy applicable to the third group of users to a management component executing on the client device, the security policy specifying a limitation of functionality of the client device to be imposed by the management component.

9. The method of claim 8, further comprising removing from the third list of members in the third group of users any user that is present in the third list of members in the third group of users and omitted from both the first list of members and the second list of members.

10. The method of claim 8, further comprising:
associating, in a table, the universal domain and the second global directory service based at least in part on domain name corresponding to the global domain.

11. The method of claim 8, further comprising:
counting a number of users to be added to the third list of members in the third group of users;
determining that the number of users to be added exceeds a threshold value; and
delaying an addition of users to the third list of members in the third group of users based at least in part on determining that the number of users to be added exceeds the threshold value until confirmation is received from an administrator.

12. The method of claim 8, wherein the global domain is a trusted domain of the universal domain.

13. The method of claim 8, wherein the second global directory service supports a lightweight directory access protocol (LDAP).

14. The method of claim 8, wherein the security policy is sent in response to an addition of a user to the third list of members in the third group of users.

15. A non-transitory computer-readable medium storing a plurality of computer instructions executable by a computing device, the plurality of computer instructions being configured to cause the computing device to at least:
determine a universal group of users for a universal domain, wherein the universal group of users is associated with:
  a first list of members in a first group of users from a first global directory service,
  a second list of members in a global group of users from a second global directory service,
  a third list of members corresponding to a user list maintained by at least one service, and
  a plurality of client devices managed by the at least one service;
determine that the global group of users is a member of the first group of users, wherein the global group of users are members of a global domain stored in the second global directory service hosted by a global domain controller for the global domain;

retrieve the second list of members in the global group of users for the global domain from the second global directory service;

compare the first list of members in the first group of users and the second list of members in the global group of users with the third list of members, wherein a third group of users comprises the third list of members; and add, to the third list of members in the third group of users, each user that is both:
- present in the first list of members or in the second list of members, and
- missing from the third list of members in the third group of users;

determine that a user in the third group of users is associated with a client device of the plurality of client devices; and send a security policy applicable to the third group of users to a management component executing on the client device, the security policy specifying a limitation of functionality of the client device to be imposed by the management component.

16. The non-transitory computer-readable medium of claim 15, wherein the plurality of computer instructions are further configured to cause the computing device to at least remove from the third list of members in the third group of users any user that is present in the third list of members in the third group of users and omitted from both the first list of members and the second list of members.

17. The non-transitory computer-readable medium of claim 15, wherein the plurality of computer instructions are further configured to cause the computing device to at least:
associate, in a table, the universal domain and the second global directory service based at least in part on a domain name corresponding to the global domain.

18. The non-transitory computer-readable medium of claim 15, wherein the plurality of computer instructions are further configured to cause the computing device to at least:
count a number of users to be added to the third list of members in the third group of users;
determine that the number of users to be added exceeds a threshold value; and
delay an addition of users to the third list of members in the third group of users based at least in part on the number of users to be added exceeding the threshold value until confirmation is received from an administrator.

19. The non-transitory computer-readable medium of claim 15, wherein the global domain is a trusted domain of the universal domain.

20. The non-transitory computer-readable medium of claim 15, wherein the security policy is sent in response to an addition of a user to the third list of members in the third group of users.

* * * * *